(No Model.)

C. N. SOUTHER.
GALVANIC BATTERY.

No. 461,965. Patented Oct. 27, 1891.

Witnesses.
Ambrose Risdon
Robert Ryan

Inventor.
Calvin N. Souther
By Cyrus Kehr.
Atty's.

UNITED STATES PATENT OFFICE.

CALVIN N. SOUTHER, OF CHICAGO, ILLINOIS.

GALVANIC BATTERY.

SPECIFICATION forming part of Letters Patent No. 461,965, dated October 27, 1891.

Application filed March 23, 1891. Serial No. 386,053. (No model.)

*To all whom it may concern:*

Be it known that I, CALVIN N. SOUTHER, a citizen of the United States, residing at Chicago, in the county of Cook and State of Illinois, have invented certain new and useful Improvements in Galvanic Batteries; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This improvement relates to galvanic batteries which are designed principally to be used on closed-circuit work.

The object of the invention is to produce a cell of strong and uniform current and which may be cheaply constructed and maintained. The cell is to be classed among the so-called "two-liquid" batteries, though in fact it can hardly be said that I use more than one liquid, one of my liquids scarcely entering into the chemical action and being limited in quantity.

Figure 1:
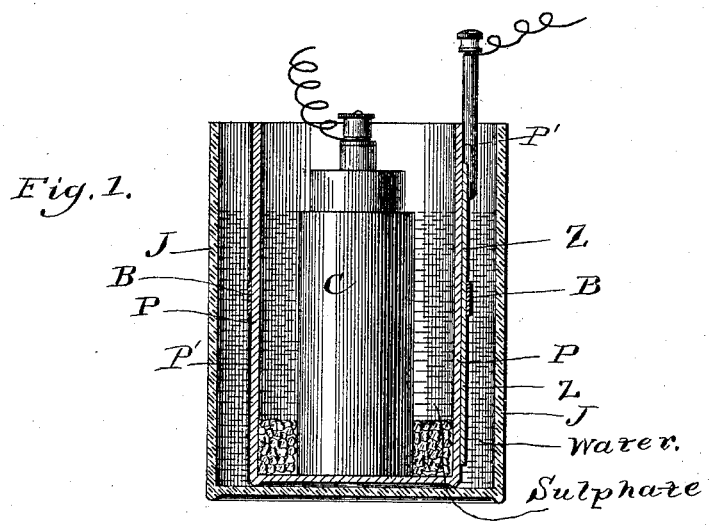
Figure 2:
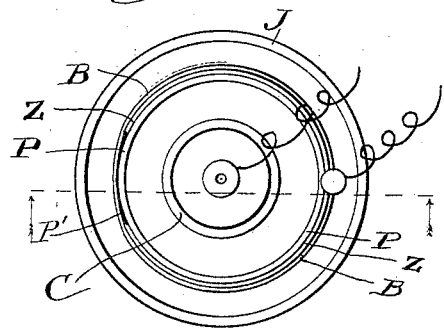

In the accompanying drawings, Figure 1 is a vertical section of a battery embodying my improvement. Fig. 2 is a plan of the same.

J is an ordinary jar of glass or other suitable material for containing the operative portions of the battery.

P is the well-known porous cup heretofore used in two-liquid batteries. This is located within the jar J and may be of any suitable shape.

C is an electrode located within the porous cup. This may be of copper or lead or any other metal which has a sulphate suitable for use as an exciting agent, or, in lieu of a metallic electrode, a carbon electrode may be used. Surrounding the electrode C and filling the space between the latter and the porous cup is a sulphate of any metal which is suitable as an exciting agent—as, for example, copper sulphate, lead sulphate, or mercury sulphate. If a metallic electrode C is used, the sulphate of that metal should be used. If a carbon electrode is used, the metal of the sulphate is deposited upon the carbon, so that the latter is finally a carbon-metal electrode. The sulphate may be in the form of a solution, preferably saturated, and in addition to the solution there may be powder or crystal in the solution or arranged to descend into the solution to dissolve and maintain the strength of the solution.

Z is a zinc electrode, preferably in the form of a hollow cylinder or a part of a hollow cylinder, and surrounding the porous cup and bearing against the outer surface of the latter and there secured by one or more bands B. The portions of the outer surface of the porous cup which are not covered by the zinc are preferably sealed with a coating of paraffine P' or other similar matter. The space between the glass jar and the zinc electrode is filled with water. It may, however, be filled with a sulphate solution; but I prefer a solution which is neutral, in order that there may be no or only slight chemical action upon the outer surface of the zinc. By thus placing the zinc directly against the outer face of the porous cup the saturated solution is kept entirely or almost entirely within the porous cup, only enough passing through the latter to act upon the inner face of the zinc.

By the tests it has been ascertained that a cell constructed as described generates a current as soon as it is set up and continues to generate a strong and uniform current for a long time.

I claim as my invention—

1. In a galvanic battery, the combination, with a suitable retaining-vessel, of a porous wall, an electrode located at one side of said wall, a metallic sulphate surrounding said electrode and extending to said porous wall, a zinc electrode located at the opposite side of and in contact with said porous wall, and a suitable liquid, preferably water, resting against said zinc and the exposed portions of the side of said porous wall at which the zinc is located, substantially as described.

2. In a galvanic battery, the combination, with a suitable retaining-vessel, of a porous cup located within said retaining-vessel, an electrode located within said porous cup, a metallic sulphate surrounding said electrode within said porous cup and extending to the inner face of the latter, a zinc electrode applied to the outer face of said porous cup, and a suitable liquid, preferably water, in the space between said zinc and the retaining-vessel, substantially as shown and described.

3. In a galvanic battery, the combination, with a suitable retaining-vessel, of a porous cup located within said retaining-vessel, a carbon electrode located within said porous cup, a metallic sulphate surrounding said carbon electrode within said porous cup and extending to the inner face of the latter, a zinc electrode applied to the outer face of said porous cup, and a suitable liquid, preferably water, in the space between said zinc and the retaining-vessel, substantially as shown and described.

4. In a galvanic battery, the combination, with a suitable retaining-vessel, of a porous cup located within said retaining-vessel, a carbon electrode located within said porous cup, copper sulphate surrounding said carbon electrode within said porous cup and extending to the inner face of the latter, a zinc electrode applied to the outer face of said porous cup, and a suitable liquid, preferably water, in the space between said zinc and the retaining-vessel, substantially as shown and described.

In testimony whereof I affix my signature, in presence of two witnesses, this 18th day of March, 1891.

CALVIN N. SOUTHER.

Witnesses:
CYRUS KEHR,
AMBROSE RISDON.